Figure 4:
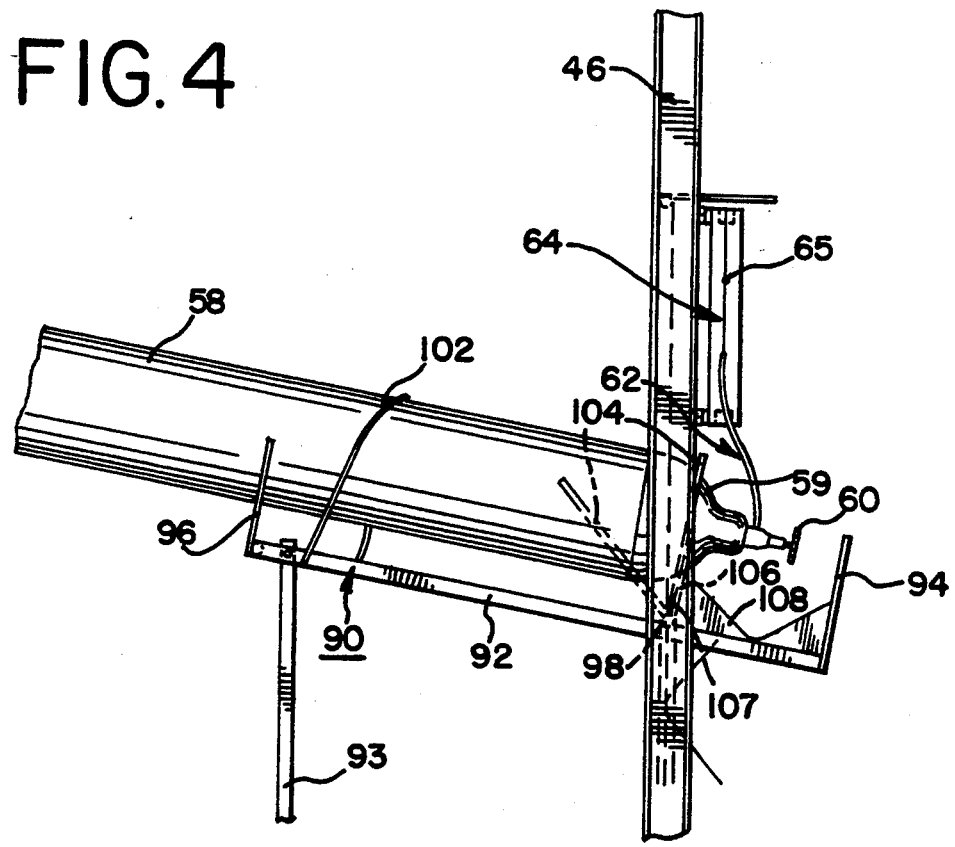
Figure 5:
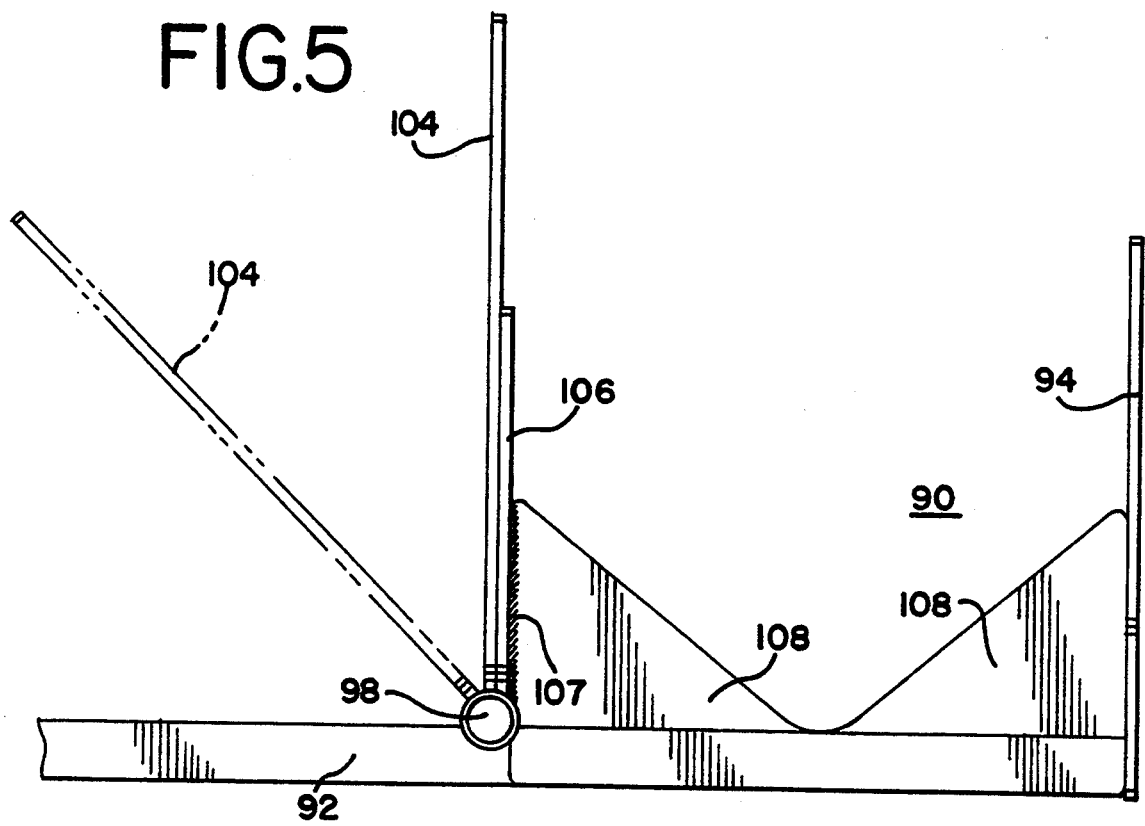

United States Patent [19]

Anderson et al.

[11] Patent Number: 5,355,962

[45] Date of Patent: Oct. 18, 1994

[54] AMPLIFIED MIXER-BLOWER MECHANISM AND USES THEREOF

[75] Inventors: William E. Anderson, Jefferson; Jon L. Curzon, Atlanta; Donald M. Davis, Gainsville, all of Ga.

[73] Assignee: LaRoche Industries, Inc., Atlanta, Ga.

[21] Appl. No.: 874,587

[22] Filed: Apr. 24, 1992

[51] Int. Cl.$^5$ ............................................. A62C 31/02
[52] U.S. Cl. ...................................... 169/70; 406/153
[58] Field of Search ................ 169/70, 52; 406/153; 239/407, 412, 424, 146, 147, 280, 280.5, 281; 211/60.1; 414/546, 469

[56] References Cited

U.S. PATENT DOCUMENTS

| | | | |
|---|---|---|---|
| 1,087,634 | 2/1914 | Boyce | 239/281 |
| 1,251,238 | 12/1917 | Kern | 414/546 X |
| 2,475,205 | 7/1949 | Slottman | 239/281 X |
| 2,746,620 | 5/1956 | Lindle | 414/546 |
| 3,680,786 | 8/1972 | Levy | 239/146 |
| 4,046,492 | 9/1977 | Inglis. | |
| 4,113,019 | 9/1978 | Sobolev et al. | 169/12 |
| 4,228,958 | 10/1980 | Perry | 239/412 X |
| 4,473,186 | 9/1984 | Alperin | 239/424 X |
| 4,569,484 | 2/1986 | Phatak | 239/412 X |
| 4,738,582 | 4/1988 | Roberts | 414/546 |
| 4,930,705 | 6/1990 | Broerman. | |
| 4,947,592 | 8/1990 | Lloyd et al.. | |
| 5,018,667 | 5/1991 | Lloyd. | |
| 5,050,805 | 9/1991 | Lloyd et al.. | |
| 5,063,015 | 11/1991 | Lloyd et al.. | |
| 5,071,289 | 12/1991 | Spivak. | |
| 5,109,636 | 5/1992 | Lloyd et al.. | |

*Primary Examiner*—David M. Mitchell
*Assistant Examiner*—G. Hoge
*Attorney, Agent, or Firm*—Jones, Day, Reavis & Pogue

[57] ABSTRACT

An amplified mixer-blower device for discharging a feed material at high velocity and enhanced volume using a venturi transport principle. Preferably, carbon dioxide vapor is used as a means for propelling the feed material which may have a different phase of the same composition of the propulsive gas, or constitute an entirely different material. The apparatus is suitable for a number of applications such as neutralizing airborne ammonia vapor or droplets, extinguishing a flammable liquid, and conveying solid materials.

12 Claims, 4 Drawing Sheets

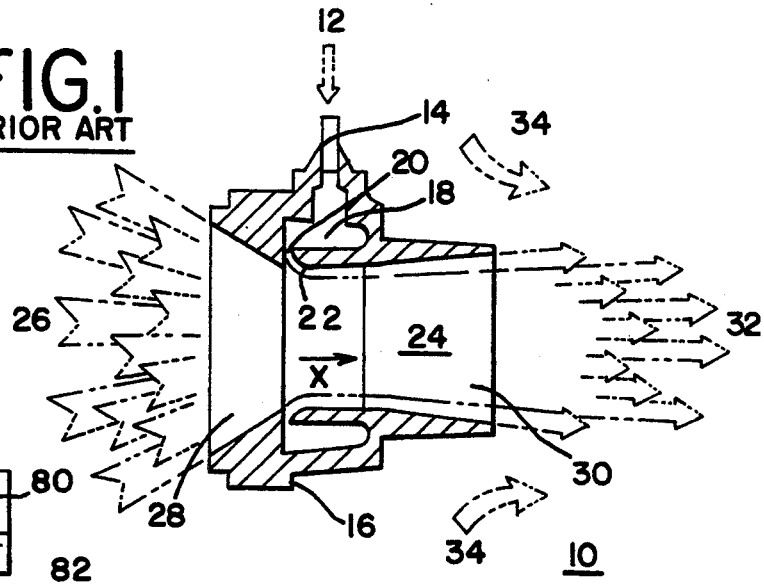
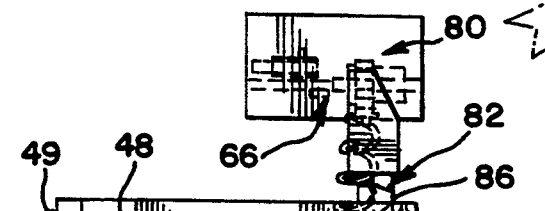
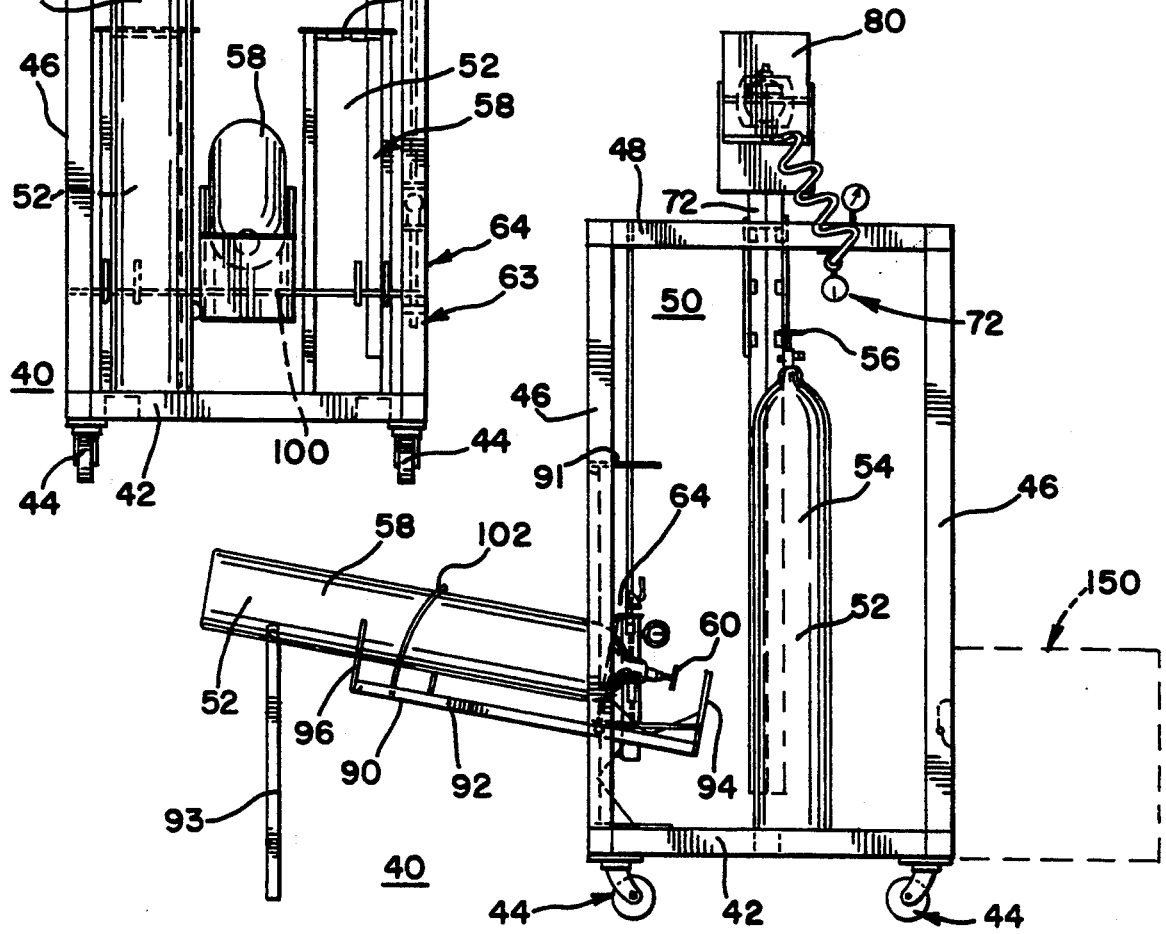

AMPLIFIED MIXER-BLOWER MECHANISM AND USES THEREOF

BACKGROUND OF THE INVENTION

The present invention relates generally to an apparatus for storing, suctioning, mixing, and discharging variable volumes of combined phases of gases, liquified gases, solids, or liquids for such uses as a neutralizer, extinguisher, and conveyor.

Cold storage warehouses used by the food industry are commonly chilled using ammonia as a refrigerant. This ammonia source, however, may accidentally leak from valve stems, ruptured supply lines, pump seals, etc., thereby permitting the ammonia vapor to penetrate the food cartons. Moreover, such ammonia gases or droplets present in the air in the warehouse are hazardous to humans. Such leaks are conventionally neutralized by applying liquid, gaseous, or solid carbon dioxide to form ammonium carbamate or ammonium carbonate compounds. Gaseous or liquid carbon dioxide is conventionally discharged randomly from storage cylinders. Solid blocks or pellets of carbon dioxide, more commonly known as dry ice, may also be placed within the contaminated room, and a vapor phase allowed to form.

However, considerable difficulty is created by insufficient contact between the carbon dioxide molecules and the ambient ammonia molecules. This phenomenon is caused partially by the natural separation of the heavier-than-air carbon dioxide and the lighter-than-air ammonia. Moreover, only limited directional control or mixing may be achieved by opening a cylinder valve or randomly placing solid carbon dioxide in a room.

Industries storing or using flammable liquids frequently encounter problems with ignited streams of the liquid. Conventional fire extinguishants comprise liquids randomly discharged under pressure from cylinders, which react with the flammable liquid to form an extinguishing blanket which deprives the fire of the oxygen necessary to feed it. But inefficiencies arise where a stream of extinguishant is added to a moving inflamed stream due to inadequate surface contact between the molecules.

Still other industries such as the poultry industry make use of pellets of carbon dioxide as a refrigerant, such as in climate-cooled railroad cars. Such pellets are conventionally loaded by manual labor using a shovel, which is extremely inefficient.

Venturi or eductor-type devices are known in the art, which use compressed air as a driving force to suction and propel air or some other material feed. An example of such a device is an "air amplifier" sold by Vortec, Inc.

SUMMARY OF THE INVENTION

Accordingly, it is an object of the present invention to modify a conventional air venturi or eductor device to provide a novel apparatus useful for combining phases of the same material, or combining separate phases thereof in order to suction, amplify, and propel the material for various applications.

Another object of the present invention is to provide such a blowing apparatus for which variable quantities and velocities may be selected by means of adjusting the pressures and flow rates of the phases in order to achieve a predetermined result.

Yet another object of the present invention is to provide such an apparatus for directing and controlling the addition of variable quantities of carbon dioxide to ambient ammonia, and maximize the molecular contact therebetween by simultaneously mixing variable quantities of liquid carbon dioxide and variable pressures and quantities of gaseous carbon dioxide to propel the resulting atomized material into contact with the ambient ammonia gas or droplets to commence a neutralization reaction.

Still another object of the present invention is to utilize the variable suction and discharge ability of the apparatus to recycle and direct the reaction products to selected areas.

Yet another object of the present invention is to provide such an apparatus for use as a large-capacity fire extinguisher by using gaseous carbon dioxide as a driving force to atomize and propel a liquid or solid chemical extinguishant.

Still another object of the present invention is to provide such an apparatus for use as a high-velocity conveyor by using gaseous carbon dioxide as a driving force to propel solid carbon dioxide pellets used as a refrigerant.

Yet another object of the present invention is to provide such an apparatus with readily available supplies of carbon dioxide driving gas and propelled material, the apparatus easily being moved to a desired location.

Other objects of the invention, in addition to those set forth above, will become apparent to those skilled in the art from the following disclosure.

Briefly, the invention is directed to providing an amplified mixer-blower device for discharging a feed material at high velocity and enhanced volume using a venturi transport principle. Preferably, carbon dioxide vapor is used as a means for propelling the feed material which may have a different phase of the same composition of the propulsive gas, or constitute an entirely different material. The apparatus is suitable for a number of applications such as neutralizing airborne ammonia vapor or droplets, extinguishing a flammable liquid, and conveying solid materials.

BRIEF DESCRIPTION OF THE DRAWINGS

FIG. 1 is a cross-sectional view of an air amplifier device of the prior art;

FIG. 2 is an end view of the amplified mixer-blower mechanism of the present invention;

FIG. 3 is a side view of the amplified mixer-blower of the present invention;

FIG. 4 is an enlarged view of a portion of FIG. 3;

FIG. 5 is an enlarged view of a portion of FIG. 4;

FIG. 6 is an enlarged view of a portion of FIG. 2;

FIG. 7 is a plan view of the discharge head shown in FIG. 1;

FIG. 8 is a plan view of an alternate embodiment of the discharge head; and

FIG. 9 is a graph representing the total output flow of discharged material from the amplified mixer-blower mechanism at varying inlet vapor pressures.

DETAILED DESCRIPTION OF THE PREFERRED EMBODIMENT

FIG. 1 illustrates an air amplifier 10 known to the prior art. Compressed air 12 flows through inlet 14 of amplifier body 16 into an annular chamber 18. The compressed air 12 is then throttled through a narrow annular orifice 20 at a high velocity. At this point, the air adheres to the profile of the unit flowing over a compound angle 22, which directs it in a flow path parallel to the longitudinal axis X of body 16. In so doing, a low pressure zone is created within the center portion 24 of body 16, thereby allowing atmospheric pressure to force ambient air 26 into the inlet 28 of the unit. High air flows, in turn, are created at the outlet 30. When used without connected ducting around outlet 30, the high-velocity, high-volume, output air stream 32 will entrain additional air 34 from the surroundings so that the total amount of air moved 32 can triple to as much as 30–45 times the compressed air consumption 12. Thus, the air is "amplified."

FIGS. 2–9 illustrate the structure of the blower mechanism 40 of the present invention. Track base 42 is mounted on casters 44, which permit portable movement of the apparatus. At the same time, casters 44 may be locked using conventional means to provide secure, stationary position of the apparatus.

Mounted at the four corners of base 42, and arising therefrom are posts 46, which terminate in cross supports 48 for rigidity. Posts 46, cross supports 48, and track base 42 combine to define a holding chamber 50 for cylinders 52. Cylinders 54 containing gaseous carbon dioxide are loaded in chamber 50 with valve 56 in an upwards direction. At the same time, cylinders 58 containing liquid carbon dioxide are loaded with valves 60 in a downwards position. Holding chamber 50 may be dimensioned to contain any number of cylinders 52 depending upon the volume of carbon dioxide typically needed to be discharged. However, given the fact that the fully loaded cylinders weigh approximately 200 pounds each, it has been found that a blower mechanism 40 containing more than nine cylinders is difficult to control while moving.

As shown more clearly in FIG. 4, the valved ends 60 of liquid carbon dioxide cylinders 58 are connected by means of suitable hose 62 to a liquid manifold 64, having a plurality of tapped holes 65. The liquid manifold, in turn, is connected to liquid discharge valve 66 by means of hose 134 (see FIG. 7).

Figure 6:
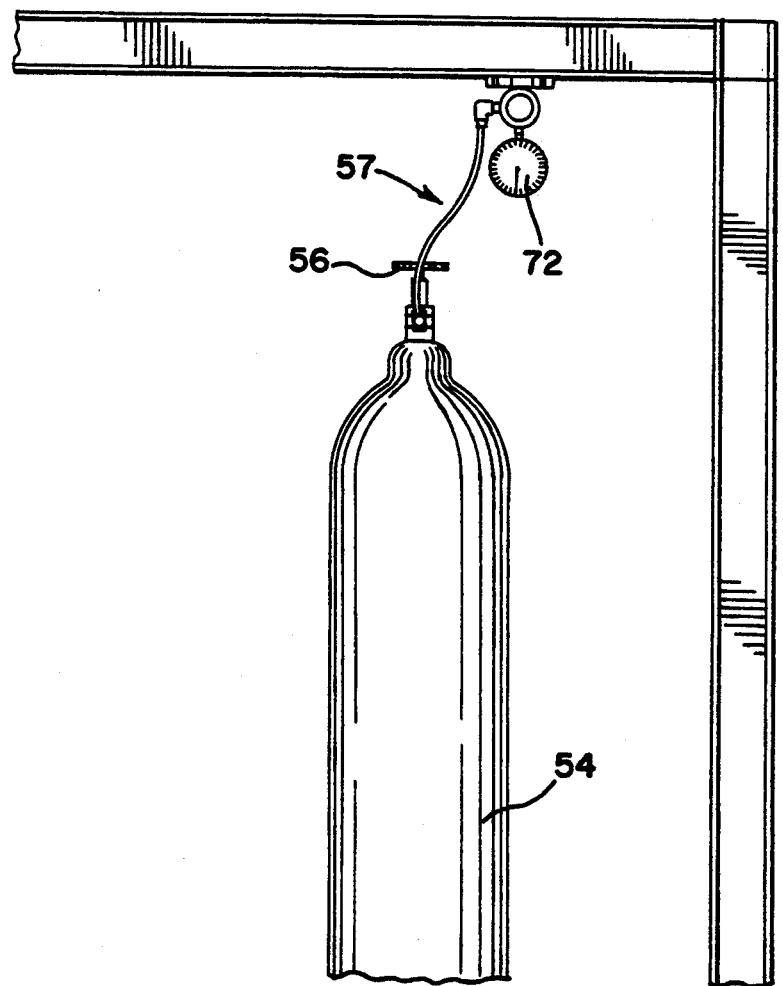

As shown in FIG. 6, the valve ends 66 of gaseous carbon dioxide cylinders 54, are connected by means of suitable hose 57 to respective tapped holes (not shown) in vapor manifold 70, leading to charge valve 56. In a preferred embodiment, hose 57 communicates with vapor manifold 70 through gauge 72, which monitors the pressure of the carbon dioxide gas delivered through charge valve 56.

Vapor manifold 70 and liquid manifold 64 may also be provided with inlet ports 49 and 63, respectively, which may be easily connected to nonportable vapor and liquid reservoirs for higher-capacity discharge applications.

Discharge head 80 is mounted on pole 82, which permits the head may be raised or lowered, as needed, by height adjustment handle 84. At the same time, discharge head 80 may be pivoted by means of angle adjustment handle 86 and a conventional associated gear assembly (not shown). In this manner, discharged carbon dioxide may be quickly and easily directed to a specific area.

Fully loaded cylinders 52 are heavy and unwieldy to lift and position. Therefore, blower mechanism 40 is equipped with a loading rack 90, which is shown in greater detail in FIG. 4. Loading rack 90 comprises a longitudinal member 92 terminating at one end with a rigid foot 94 perpendicular thereto. Positioned perpendicular to the other end of longitudinal member 92 is cradle 96 having a cutaway region (not shown) along its end for accommodating cylinder 58. The diameter of the cutaway region should be slightly larger than the outside diameter of the cylinder (e.g., 9 inches). Loading rack 90 pivots at point 98 about a cross member 100 (see FIG. 2) connected transversely to two of the posts 36. It also has a pivotable support 93 used during loading of liquid cylinders.

Gas cylinders 54 may be simply and easily loaded into holding chamber 50 by pivoting rack 90 until the cradle end touches the ground. Next, cylinder 54 is laid on the ground with the bottom portion of the cylinder positioned on the cradle 96 with securing strap 102 wrapped around the cylinder. The cylinder 54 and rack 90 assembly are then raised, using the weight and length of the cylinder as a lever to pivot the rack back to its original position, thereby sliding the bottom of the cylinder into engagement with foot 94, and loading the cylinder into holding chamber 50. Although empty, discharged cylinders are much lighter, they may be easily unloaded by reversing this process.

Connected to longitudinal member 92 at pivot point 98 is support disk 104, which may easily be pivoted out of the way when a gas cylinder is being loaded. Disk 104 has a hole (not shown) removed which is smaller in diameter than the outside diameter of a cylinder. For example, a 7½-inch hole might be used for a 9-inch diameter cylinder. When pivoted to its engaged position, disk 104 rests against plate 106, which is secured in place to gusset 108 by means of weld 107 (see FIG. 5). Thus, not only does plate 106 provide a rigid support for disk 104 when the weight of an inverted liquid cylinder is placed thereon, but also it bears the same cutaway region as cradle 96 in order to provide a secondary cradle support for the side of an upright gas cylinder when disk 104 is pivoted out of the way against longitudinal member 92.

In order to load a liquid cylinder 58, loading rack 90 is pivoted to the nearly horizontal position shown in FIG. 4, and support 93 is pivoted to a vertical position so that its bottom rests on the ground, leaving the longitudinal member approximately at a 10° incline. The cylinder is then tilted against cradle 96 in an upwards direction. Not only does cylinder 58 slide along longitudinal member 92 so that the tapered region 59 of the cylinder engages support disk 104, but also the length and weight of the cylinder may effectively be used as a lever to rotate rack 90 into a vertical position to load the cylinder into its inverted position with valve 60 pointing down.

The pivot point 98 of longitudinal member 92 should be selected such that the rack with an inverted cylinder 58 secured thereto may be pivoted without striking valve 60 on the cart and so the cover over the valve may be removed. Moreover, in order to properly utilize the center of mass of the liquid-filled cylinder 58, the pivot point 98 of longitudinal member 92 should lie nearer to foot 94 than to cradle 96. Experience has found that an average human can lift approximately 60–75% of the weight of the cylinder and rack, and handle approximately 70% of cylinder length. Therefore, the pivot point should preferably be positioned approximately 25–40% along the longitudinal member with respect to foot 94, and more preferably approximately 26–30% thereon.

Extra loading racks 90 are preferably affixed to cross-member 100 so that multiple gas and liquid cylinders may be loaded into and unloaded from holding chamber 50. When a rack 91 is not needed, it may easily be pivoted out of the way as shown in FIGS. 2 and 3.

Figure 7:
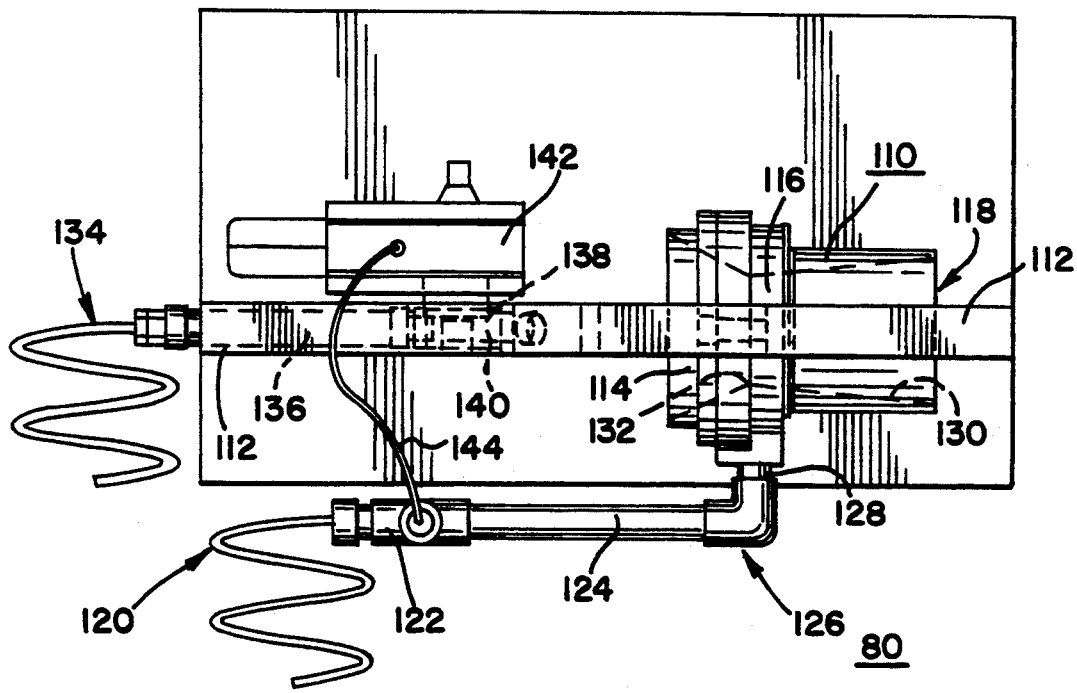
Figure 8:
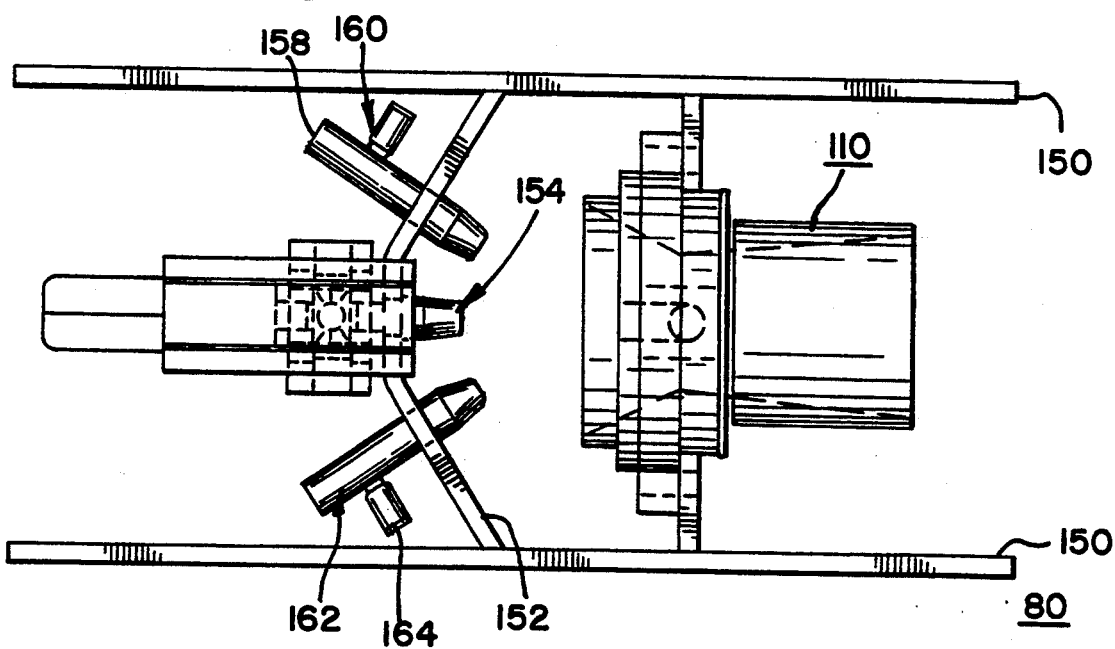

Discharge head 80 of the present invention is shown in greater detail in FIGS. 7 and 8. Blower amplifier 110 is attached to support beam 112, and is constructed in a similar manner to the air amplifier shown in FIG. 1. The blower amplifier 110 may constitute air amplifier Model No. 904 sold by Vortec, Inc. It has a feed inlet 114, a center region 116, and a discharge outlet 118. Hose 120 from vapor manifold 70 delivers gaseous carbon dioxide through bleeder junction 122, conduit 124, and elbow joint 126, to the gas inlet 128 of blower amplifier 110. The gaseous carbon dioxide enters center region 116 at high velocity through an annular chamber and narrow orifice (not shown), and sweeps along the interior wall 130 defined by compound angle 132 to provide a vacuum.

Feed material, such as liquid carbon dioxide, is delivered to feed inlet 114 of blower amplifier 110 by means of hose 134 extending from liquid manifold 64, conduits 136, ejector nozzle 138, and control valve 140 position therebetween. All of these components are secured to support beam 112. The liquid carbon dioxide is pulled rapidly into the center region 116 of blower amplifier 110, where it mixes with the gaseous carbon dioxide, and is expelled from discharge outlet 118 of blower amplifier 110 at high velocity. Air surrounding the outlet end of the blower amplifier may be entrained in the liquid-gas carbon dioxide discharge to further expand its volume. Thus, the liquid carbon dioxide feed may be expanded twenty-fold in volume.

Control valve 140 regulates the liquid feed to the blower amplifier 110 by means of a pilot valve 142 like Model No. 86-1-RT-1-412SR sold by Jemini Corporation. The liquid pilot valve 142, in turn, is actuated by the vapor pressure communicated thereto through bleeder junction 122 and hose 144. Therefore, liquid carbon dioxide is not delivered to blower amplifier 110 until there is sufficient vapor pressure present to provide the necessary propulsive force for discharge. In the preferred embodiment, pilot valve 142 opens under 25 psig pressure, and is fully opened at 60 psig.

FIG. 8 shows a slightly different construction for discharge head 80 in which blower amplifier 110 and pilot valve 140 are the same as described above and depicted in FIG. 6, and are secured to structural frame 150, including appropriate cross-members 152. Pilot valve 140 is connected directly to ejection nozzle 154, which delivers a stream of the liquid feed material, such as liquid carbon dioxide, to feed inlet 114 of blower amplifier 110. Hose 134 is connected by appropriate means to ejection nozzle 154, and the nozzle has adjustment control 156 for regulating the flow rate of the liquid feed material through the nozzle.

Additional ejection nozzles 158 and 162 having adjustment controls 160 and 164, respectively, may be secured to cross-member 152 and pointed towards feed inlet 114 of blower amplifier 110 for accommodating an application in which more than one liquid feed material is required.

The blower mechanism 40 of the present invention may be used very effectively as a high-discharge, high-velocity neutralizer of ambient ammonia vapor and droplets contained in a refrigerated warehouse by rolling it or carrying it by a fork lift from its standby area to the leak area. The blower mechanism 40 is turned on by rotating charge valve 56 to the desired thrust position, adjusting the liquid valve 66 to the desired liquid discharge position, and positioning the discharge head 80 by rotating height adjustment handle 84 and angle adjustment handle 86.

Gaseous carbon dioxide will be immediately delivered by means of vapor manifold 70 to discharge head 80 to provide the driving means needed to suction, amplify, and atomize liquid carbon dioxide delivered to the inlet end of discharge head 80. The atomized carbon dioxide ejected at high velocities from the discharge head reacts with the ambient ammonia to produce fine ammonium carbamate or ammonium carbonate powder, which may easily be swept up and removed from the warehouse.

Flexible ductwork 113 may be placed around the impacted work area, and connected to the feed inlet 114 of blower amplifier 110. In this case, unreacted carbon dioxide and ammonia, and the reaction products will be drawn through the blower amplifier to provide a means for recycling the material to provide a more efficient neutralization reaction. This recycle option is good for other applications of the blower amplifier as well.

Figure 9:
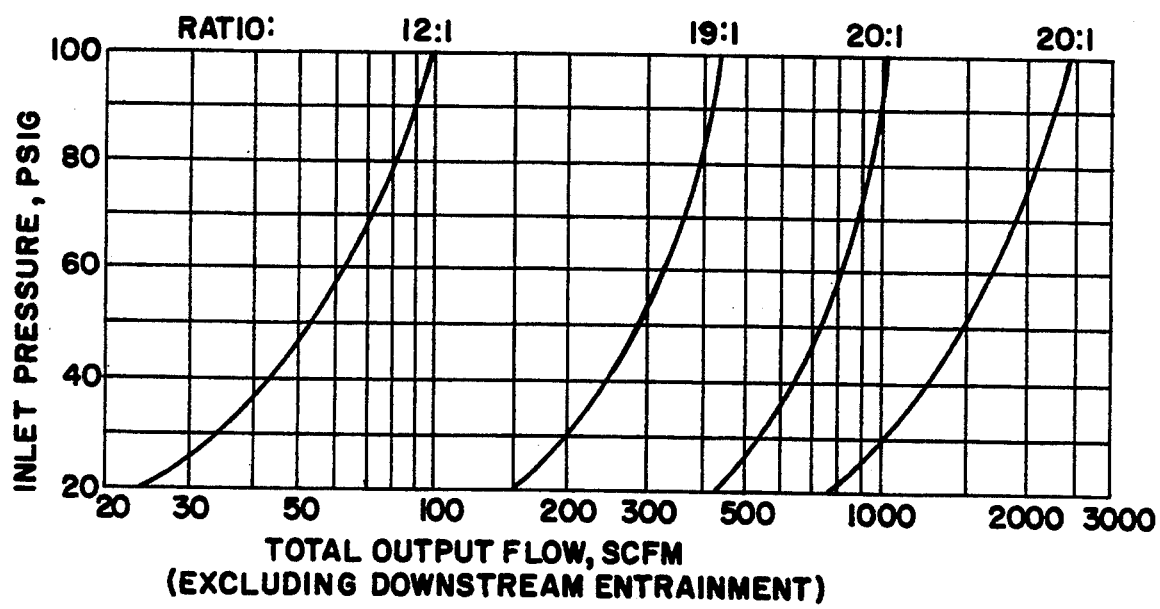

FIG. 9 illustrates the total output capability of the blower mechanism 30 in terms of $ft^3/min$ at specific inlet pressure levels. For a 20:1 amplification model of discharge head 80, it is possible to vary the carbon dioxide discharge from 0–50 $ft^3/min$, and the ambient air discharge from 0–950 $ft^3/min$. If higher volumes of carbon dioxide discharge are required, the ambient air discharge volume, or any portion thereof, may be replaced by gaseous carbon dioxide by adjusting liquid valve 66 clockwise until the desired discharge is obtained. Excessive adjustment of liquid valve 66 will be evidenced by discharge of white carbon dioxide vapor from the back end of discharge head 80, instead of the front end, alone.

Experiments with the blower mechanism 40 have shown that the entire 450 lb. (approximately 6000 $ft^3$) load of carbon dioxide can be discharged within a 50–60-minute period if the charge and liquid valves 56 and 66, respectively, are fully opened. These valves, in turn, may be adjusted to a slower discharge rate as the situation may require. Data for six vapor bottles and three liquid bottles of carbon dioxide follows.

| Discharge $CO_2$ Concentration | Liquid Valve Position | Vapor Line Pressure | Discharge Time |
| --- | --- | --- | --- |
| 98% | Fully open | 100 psi | 45 minutes |
| 50% | 50% | 100 psi | 45 minutes |
| 50% | 50% | 50 psi | 70 minutes |
| 50% | 50% | 25 psi | 100 minutes |
| 5% | 5% | 100 psi | 45 minutes |
| 5% | 5% | 50 psi | 70 minutes |
| 5% | 5% | 25 psi | 100 minutes |

If higher concentrations of carbon dioxide are desired in a shorter time period, then the mixture of vapor and liquid bottles should be changed to three vapor bottles and six liquid bottles.

The blower mechanism 40 of the present invention may also be used as an effective high-discharge fire extinguisher. Carbon dioxide gas is combined with a liquid or solid chemical extinguishant and ejected as an atomized, high-velocity liquid on the inflamed liquid, creating a blanketing chemical reaction. This combination provides for more rapid extinguishment than if a liquid extinguishant were discharged by conventional means. Moreover, reignition or flashback of the fire is prevented. While many extinguishants are known in the prior art, a composition including potassium carbonate, a boron containing compound like boric acid, and water is noncorrosive to metals and, therefore, particularly preferred. This compound, as well as one including a potassium salt of an organic acid having from 1 to 6 carbon atoms (e.g., potassium acetate), is the subject matter of U.S. Pat. No. 4,756,839 issued to Curzon, et al., and the disclosure of this patent is incorporated hereby by reference.

If additional materials along with the liquid carbon dioxide, or in lieu thereof, is required, additional injection valves may be mounted beside liquid valve 66, and adjusted as needed. Furthermore, if any application requires blowing pellets of dry ice into an area, such as a refrigerated railroad car, a dry ice storage hopper 150 may be mounted to posts 46, and the pellets fed manually into the inlet end of the blower amplifier 110.

While particular embodiments of the invention have been shown and described, it should be understood that the invention is not limited thereto, since many modifications may be made. For instance, instead of carbon dioxide, argon, helium, hydrogen, nitrogen, neon or oxygen may be simultaneously mixed with feed material and conveyed to achieve selected results. The invention is therefore contemplated to cover by the present application any and all such modifications which fall within the true spirit and scope of the basic underlying principles disclosed and claimed herein.

What is claimed is:

1. A blower device for mixing and discharging an amplified discharge of liquid or solid material at high velocity and enhanced volume, comprising:
   (a) a source of propulsive media other than air in the gaseous phase;
   (b) a source of carbon dioxide in the liquid or solid phase;
   (c) a discharge head having;
      (i) an elongated housing having an hourglass-shaped passageway therethrough in the longitudinal direction, defining a flow path for the liquid or solid carbon dioxide;
      (ii) a gas inlet in said housing perpendicular to the longitudinal direction thereof for introduction of the propulsive gas media to a collection chamber in said housing;
      (iii) a tapered annular orifice between the collection chamber and the passageway for causing an increase in the velocity of the propulsive gas media passing therethrough to a central region in the passageway to cause a diminished pressure condition therein;
      (iv) a feed chamber located in one end of the passageway for introduction of the carbon dioxide, the feed chamber communicating with the central region of the passageway; and
      (v) a discharge outlet at the other end of said housing, an amplification chamber being defined between the discharge outlet and the central region of the passageway so that the carbon dioxide is drawn rapidly into the central region of the passageway and mixed with the propulsive gas media therein, the mixture increasing in volume in the amplification chamber of said housing, and being discharged therefrom to a work area at high velocity to further expand in volume.

2. A blower device for mixing and discharging an amplified discharge of liquid or solid material at high velocity and enhanced volume, comprising:
   (a) a source of propulsive media other than air in the gaseous phase;
   (b) a source of feed material in the liquid or solid phase having the same composition as the propulsive gas media, or a different composition thereof;
   (c) a discharge head having;
      (i) an elongated housing having an hourglass-shaped passageway therethrough in the longitudinal direction, defining a flow path for the liquid or solid feed material;
      (ii) a gas inlet in said housing perpendicular to the longitudinal direction thereof for introduction of the propulsive gas media to a collection chamber in said housing;
      (iii) a tapered annular orifice between the collection chamber and the passageway for causing an increase in the velocity of the propulsive gas media passing therethrough to a central region in the passageway to cause a diminished pressure condition therein;
      (iv) a feed chamber located in one end of the passageway for introduction of the feed material, the feed chamber communicating with the central region of the passageway; and
      (v) a discharge outlet at the other end of said housing, an amplification chamber being defined between the discharge outlet and the central region of the passageway so that the feed material is drawn rapidly into the central region of the passageway and mixed with the propulsive gas media therein, the mixture increasing in volume in the amplification chamber of said housing, and being discharged therefrom to a work area at high velocity to further expand in volume;
   (d) an adjustable valve for regulating the flow rate of the propulsive gas media to said housing;
   (e) a storage cylinder comprising said source of propulsive gas media in operative communication with the gas inlet of said housing by means of a conduit means; and
   (f) a manifold in communication with the gas inlet of said housing, the manifold having a plurality of inlets for connection to two or more gas storage cylinders by conduit means so that the ejection rate of the discharged mixture may be increased.

3. A blower device for mixing and discharging an amplified discharge of liquid or solid material at high velocity and enhanced volume, comprising:
   (a) a source of propulsive media other than air in the gaseous phase;
   (b) a source of feed material in the liquid or solid phase having the same composition as the propulsive gas media, or a different composition thereof;
   (c) a discharge head having;
      (i) an elongated housing having an hourglass-shaped passageway therethrough in the longitudinal direction, defining a flow path for the liquid or solid feed material;
      (ii) a gas inlet in said housing perpendicular to the longitudinal direction thereof for introduction of the propulsive gas media to a collection chamber in said housing;
      (iii) a tapered annular orifice between the collection chamber and the passageway for causing an increase in the velocity of the propulsive gas media passing therethrough to a central region in the passageway to cause a diminished pressure condition therein;

(iv) a feed chamber located in one end of the passageway for introduction of the feed material, the feed chamber communicating with the central region of the passageway; and (v) a discharge outlet at the other end of said housing, an amplification chamber being defined between the discharge outlet and the central region of the passageway so that the feed material is drawn rapidly into the central region of the passageway and mixed with the propulsive gas media therein, the mixture increasing in volume in the amplification chamber of said housing, and being discharged therefrom to a work area at high velocity to further expand in volume;

(d) an adjustable valve for regulating the flow rate of the feed material to said housing;

(e) a storage cylinder comprising said source of feed material in operative communication with the feed chamber of said housing by means of conduit means; and (f) a manifold in communication with the feed chamber of said housing, the manifold having a plurality of inlets for connection to two or more storage cylinders by conduit means so that the volume of the discharged mixture may be increased.

4. A blower device for mixing and discharging an amplified discharge of liquid or solid material at high velocity and enhanced volume, comprising:

(a) a source of propulsive media other than air in the gaseous phase;

(b) a source of feed material in the liquid or solid phase having the same composition as the propulsive gas media, or a different composition thereof;

(c) a discharge head having;

(i) an elongated housing having an hourglass-shaped passageway therethrough in the longitudinal direction, defining a flow path for the liquid or solid feed material;

(ii) a gas inlet in said housing perpendicular to the longitudinal direction thereof for introduction of the propulsive gas media to a collection chamber in said housing;

(iii) a tapered annular orifice between the collection chamber and the passageway for causing an increase in the velocity of the propulsive gas media passing therethrough to a central region in the passageway to cause a diminished pressure condition therein;

(iv) a feed chamber located in one end of the passageway for introduction of the feed material, the feed chamber communicating with the central region of the passageway; and (v) a discharge outlet at the other end of said housing, an amplification chamber being defined between the discharge outlet and the central region of the passageway so that the feed material is drawn rapidly into the central region of the passageway and mixed with the propulsive gas media therein, the mixture increasing in volume in the amplification chamber of said housing, and being discharged therefrom to a work area at high velocity to further expand in volume;

(d) an adjustable valve for regulating the flow rate of the propulsive gas media to said housing;

(e) a storage cylinder comprising said source of propulsive gas media in operative communication with the gas inlet of said housing by means of a conduit means;

(f) a cart attached to said blower housing for containing storage cylinders; and (g) a rack pivotably connected to said cart for loading and unloading storage cylinders into and out of said cart, said rack comprising a longitudinal member having support means for securing a storage cylinder thereto, said rack being pivotably connected to said cart at a position along the longitudinal member so that the length and weight of the secured cylinder may be used to pivot the cylinder and rack assembly with respect to said cart, said support means comprising a foot connected to one end of said longitudinal member and perpendicular thereto for supporting the bottom surface of a gas storage cylinder and further comprising a cradle connected to the other end of the longitudinal member and perpendicular thereto, said cradle having a cutaway region along an end having a diameter substantially similar to the outside diameter of the storage cylinder.

5. A blower device for mixing and discharging an amplified discharge of liquid or solid material at high velocity and enhanced volume, comprising:

(a) a source of propulsive media other than air in the gaseous phase;

(b) a source of feed material in the liquid or solid phase having the same composition as the propulsive gas media, or a different composition thereof;

(c) a discharge head having;

(i) an elongated housing having an hourglass-shaped passageway therethrough in the longitudinal direction, defining a flow path for the liquid or solid feed material;

(ii) a gas inlet in said housing perpendicular to the longitudinal direction thereof for introduction of the propulsive gas media to a collection chamber in said housing;

(iii) a tapered annular orifice between the collection chamber and the passageway for causing an increase in the velocity of the propulsive gas media passing therethrough to a central region in the passageway to cause a diminished pressure condition therein;

(iv) a feed chamber located in one end of the passageway for introduction of the feed material, the feed chamber communicating with the central region of the passageway; and (v) a discharge outlet at the other end of said housing, an amplification chamber being defined between the discharge outlet and the central region of the passageway so that the feed material is drawn rapidly into the central region of the passageway and mixed with the propulsive gas media therein, the mixture increasing in volume in the amplification chamber of said housing, and being discharged therefrom to a work area at high velocity to further expand in volume;

(d) an adjustable valve for regulating the flow rate of the propulsive gas media to said housing;

(e) a storage cylinder comprising said source of feed material in operative communication with the feed chamber of said housing by means of a conduit means;

(f) a cart attached to said blower housing for containing storage cylinders; and (g) a rack pivotably connected to said cart for loading and unloading storage cylinders into and out of said cart, said rack comprising a longitudinal member having support means for securing a storage cylinder thereto, said rack being pivotably connected to said cart at a position along the longitudinal member so that the length and weight of the secured cylinder may be used to pivot the cylinder and rack assembly with respect to said cart, said support means comprising a foot connected to one end of said longitudinal member and perpendicular thereto for supporting the bottom surface of a gas storage cylinder and further comprising a cradle connected to the other end of the longitudinal member and perpendicular thereto, said cradle having a cut away region along an end having a diameter substantially similar to the outside diameter of the storage cylinder.

6. A blower device for mixing and discharging an amplified discharge of liquid or solid material at high velocity and enhanced volume, comprising:

(a) a source of propulsive media other than air in the gaseous phase;

(b) a source of feed material in the liquid or solid phase having the same composition as the propulsive gas media, or a different composition thereof;

(c) a discharge head having;

(i) an elongated housing having an hourglass-shaped passageway therethrough in the longitudinal direction, defining a flow path for the liquid or solid feed material;

(ii) a gas inlet in said housing perpendicular to the longitudinal direction thereof for introduction of the propulsive gas media to a collection chamber in said housing;

(iii) a tapered annular orifice between the collection chamber and the passageway for causing an increase in the velocity of the propulsive gas media passing therethrough to a central region in the passageway to cause a diminished pressure condition therein;

(iv) a feed chamber located in one end of the passageway for introduction of the feed material, the feed chamber communicating with the central region of the passageway; and (v) a discharge outlet at the other end of said housing, an amplification chamber being defined between the discharge outlet and the central region of the passageway so that the feed material is drawn rapidly into the central region of the passageway and mixed with the propulsive gas media therein, the mixture increasing in volume in the amplification chamber of said housing, and being discharged therefrom to a work area at high velocity to further expand in volume;

(d) an adjustable valve for regulating the flow rate of the propulsive gas media to said housing;

(e) a storage cylinder comprising said source of propulsive gas media in operative communication with the gas inlet of said housing by means of a conduit means;

(f) a cart attached to said blower housing for containing storage cylinders; and, (g) a rack pivotably connected to said cart for loading and unloading storage cylinders into and out of said cart, said rack comprising a longitudinal member having support means for securing the storage cylinder thereto, said rack being pivotably connected to said cart at a position along the longitudinal member so that the length and weight of the secured cylinder may be used to pivot the cylinder and rack assembly with respect to said cart, said support means comprising a disk connectable to the longitudinal member and perpendicular thereto, said disk having a hole of a diameter less than the outside diameter of a storage cylinder so that said disk may support a tapered upper region of the cylinder when said rack loads the cylinder into said cart in an inverted position.

7. A blower device as recited in claims 6, wherein said support means further comprises a cradle connected to one end of the longitudinal member and perpendicular thereto, said cradle having a cutaway region along an end having a diameter substantially similar to the outside diameter of the storage cylinder.

8. A blower device for mixing and discharging an amplified discharge of liquid or solid material at high velocity and enhanced volume, comprising:

(a) a source of propulsive media other than air in the gaseous phase;

(b) a source of feed material in the liquid or solid phase having the same composition as the propulsive gas media, or a different composition thereof;

(c) a discharge head having;

(i) an elongated housing having an hourglass-shaped passageway therethrough in the longitudinal direction, defining a flow path for the liquid or solid feed material;

(ii) a gas inlet in said housing perpendicular to the longitudinal direction thereof for introduction of the propulsive gas media to a collection chamber in said housing;

(iii) a tapered annular orifice between the collection chamber and the passageway for causing an increase in the velocity of the propulsive gas media passing therethrough to a central region in the passageway to cause a diminished pressure condition therein;

(iv) a feed chamber located in one end of the passageway for introduction of the feed material, the feed chamber communicating with the central region of the passageway; and (v) a discharge outlet at the other end of said housing, an amplification chamber being defined between the discharge outlet and the central region of the passageway so that the feed material is drawn rapidly into the central region of the passageway and mixed with the propulsive gas media therein, the mixture increasing in volume in the amplification chamber of said housing, and being discharged therefrom to a work area at high velocity to further expand in volume;

(d) an adjustable valve for regulating the flow rate of the propulsive gas media to said housing;

(e) a storage container comprising said source of feed material in operative communication with the feed chamber of said housing by means of conduit means;

(f) a cart attached to said blower housing for containing storage cylinders; and, (g) a rack pivotably connected to said cart for loading and unloading storage cylinders into and out of said cart, said rack comprising a longitudinal member having support means for securing the storage cylinder thereto, said rack being pivotably connected to said cart at a position along the longitudinal member so that the length and weight of the secured cylinder may be used to pivot the cylinder and rack assembly with respect to said cart, said support means comprising a disk connectable to the longitudinal member and perpendicular thereto, said disk having a hole of a diameter less than the outside diameter of a storage cylinder so that said disk may support a tapered upper region of the cylinder when said rack loads the cylinder into said cart in an inverted position.

9. A blower device for mixing and discharging an amplified discharge of liquid or solid material at high velocity and enhanced volume, comprising:
(a) a source of propulsive media other than air in the gaseous phase;
(b) a source of feed material in the liquid or solid phase having the same composition as the propulsive gas media, or a different composition thereof;
(c) a discharge head having;
  (i) an elongated housing having an hourglass-shaped passageway therethrough in the longitudinal direction, defining a flow path for the liquid or solid feed material;
  (ii) a gas inlet in said housing perpendicular to the longitudinal direction thereof for introduction of the propulsive gas media to a collection chamber in said housing;
  (iii) a tapered annular orifice between the collection chamber and the passageway for causing an increase in the velocity of the propulsive gas media passing therethrough to a central region in the passageway to cause a diminished pressure condition therein;
  (iv) a feed chamber located in one end of the passageway for introduction of the feed material, the feed chamber communicating with the central region of the passageway; and
  (v) a discharge outlet at the other end of said housing, an amplification chamber being defined between the discharge outlet and the central region of the passageway so that the feed material is drawn rapidly into the central region of the passageway and mixed with the propulsive gas media therein, the mixture increasing in volume in the amplification chamber of said housing, and being discharged therefrom to a work area at high velocity to further expand in volume;
(d) means for introducing two or more feed materials to the feed chamber of said blower housing.

10. A blower device as recited in claim 9, wherein said means for introducing two or more feed materials comprises an ejection nozzle connected to a storage cylinder.

11. A blower device as recited in claim 10, wherein said ejection nozzle further comprises means for regulating flow of the feed material therethrough into the feed chamber of the blower housing.

12. A blower device as recited in claim 11, wherein said regulation means comprises an adjustable valve.

* * * * *